(12) United States Patent
Miyashita

(10) Patent No.: US 11,697,235 B2
(45) Date of Patent: Jul. 11, 2023

(54) INJECTION MOLDING APPARATUS

(71) Applicant: Seiko Epson Corporation, Tokyo (JP)

(72) Inventor: Daichi Miyashita, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/380,122

(22) Filed: Jul. 20, 2021

(65) Prior Publication Data

US 2022/0024091 A1    Jan. 27, 2022

(30) Foreign Application Priority Data

Jul. 21, 2020    (JP) .................................. 2020-124311

(51) Int. Cl.
*B29C 45/04* (2006.01)
*B29C 45/17* (2006.01)
*B29C 45/73* (2006.01)

(52) U.S. Cl.
CPC .......... *B29C 45/1742* (2013.01); *B29C 45/04* (2013.01); *B29C 45/7312* (2013.01); *B29K 2905/00* (2013.01)

(58) Field of Classification Search
CPC . B29C 45/7312; B29C 45/04; B29C 45/2737; B29C 2045/76782; B29C 2045/2766; B29C 2945/76782
See application file for complete search history.

(56) References Cited

U.S. PATENT DOCUMENTS

| 3,425,092 A * | 2/1969 | Jun ........................ B29C 45/04 264/573 |
| 2002/0140132 A1* | 10/2002 | Seta ....................... B29C 45/04 264/328.11 |
| 2003/0082265 A1* | 5/2003 | Bauer .................... B29C 48/911 425/551 |
| 2013/0202728 A1* | 8/2013 | Maenner ................. B29C 45/03 425/169 |
| 2013/0209063 A1* | 8/2013 | Suh ....................... H04N 13/189 386/241 |
| 2020/0023562 A1* | 1/2020 | Anegawa ................ B29C 45/78 |

FOREIGN PATENT DOCUMENTS

| CN | 210733079 U | 6/2020 |
| JP | H03-266620 A | 11/1991 |
| JP | 2003-062884 A | 3/2003 |

* cited by examiner

*Primary Examiner* — Alison L Hindenlang
*Assistant Examiner* — Debjani Roy
(74) *Attorney, Agent, or Firm* — Harness, Dickey & Pierce, P.L.C.

(57) ABSTRACT

An injection molding apparatus includes: a first mounting block configured such that a fixed mold is able to be mounted thereon; a second mounting block configured such that a movable mold facing the fixed mold is able to be mounted thereon, provided with a first through hole through which a first diver is inserted, and configured to move back and forth with respect to the first mounting block along the first diver; and an injection unit configured to inject a molten material into a cavity defined by the fixed mold and the movable mold. In a state where the movable mold is mounted on the second mounting block, the second mounting block includes, between the movable mold and the first through hole, a heat conduction prevention portion configured to prevent conduction of heat from the movable mold.

6 Claims, 8 Drawing Sheets

INJECTION MOLDING APPARATUS

The present application is based on, and claims priority from JP Application Serial Number 2020-124311, filed Jul. 21, 2020, the disclosure of which is hereby incorporated by reference herein in its entirety.

BACKGROUND

1. Technical Field

The present disclosure relates to an injection molding apparatus.

2. Related Art

In the related art, an injection molding apparatus is known in which a resin material such as a thermoplastic resin is injected from a nozzle into a cavity defined by a pair of metal molds.

JP-A-2003-62884 discloses an injection molding apparatus in which a molding material is supplied into a cavity defined by a pair of metal molds, and a cooling circuit is provided inside one of the metal molds, the one mold includes a moving plate and a fixed base that instructs the moving plate to move between a mold opening position and a mold closing position, and the cooling circuit is provided in the fixed base. Accordingly, unlike a configuration in which the cooling circuit is provided in the moving plate, restrictions associated with a movement of the moving plate can be eliminated.

When a molded product including a resin material such as poly ether ether ketone (PEEK) is molded in the injection molding apparatus described above, a temperature of the metal mold is high. Therefore, heat is transferred to a mounting block that fixes the metal mold, and a temperature of a slide mechanism provided in a through hole of the mounting block may exceed a heat resistant temperature. As a result, accuracy of a mold clamping is lowered, which may affect molding accuracy.

SUMMARY

An injection molding apparatus according to an aspect of the present disclosure includes: a first mounting block configured such that a fixed mold is able to be mounted thereon; a second mounting block configured such that a movable mold facing the fixed mold is able to be mounted thereon, provided with a first through hole through which a first diver is inserted, and configured to move back and forth with respect to the first mounting block along the first diver; and an injection unit configured to inject a molten material into a cavity defined by the fixed mold and the movable mold, and in a state where the movable mold is mounted on the second mounting block, the second mounting block includes, between the movable mold and the first through hole, a heat conduction prevention portion configured to prevent conduction of heat from the movable mold.

DESCRIPTION OF EXEMPLARY EMBODIMENTS

Hereinafter, preferred embodiments of the present disclosure will be described in detail with reference to drawings. The embodiments to be described below do not unreasonably limit contents of the present disclosure described in the appended claims. Not all configurations to be described below are necessarily essential components of the present disclosure.

1. Injection Molding Apparatus 1.1. Overall Configuration

Figure 1:
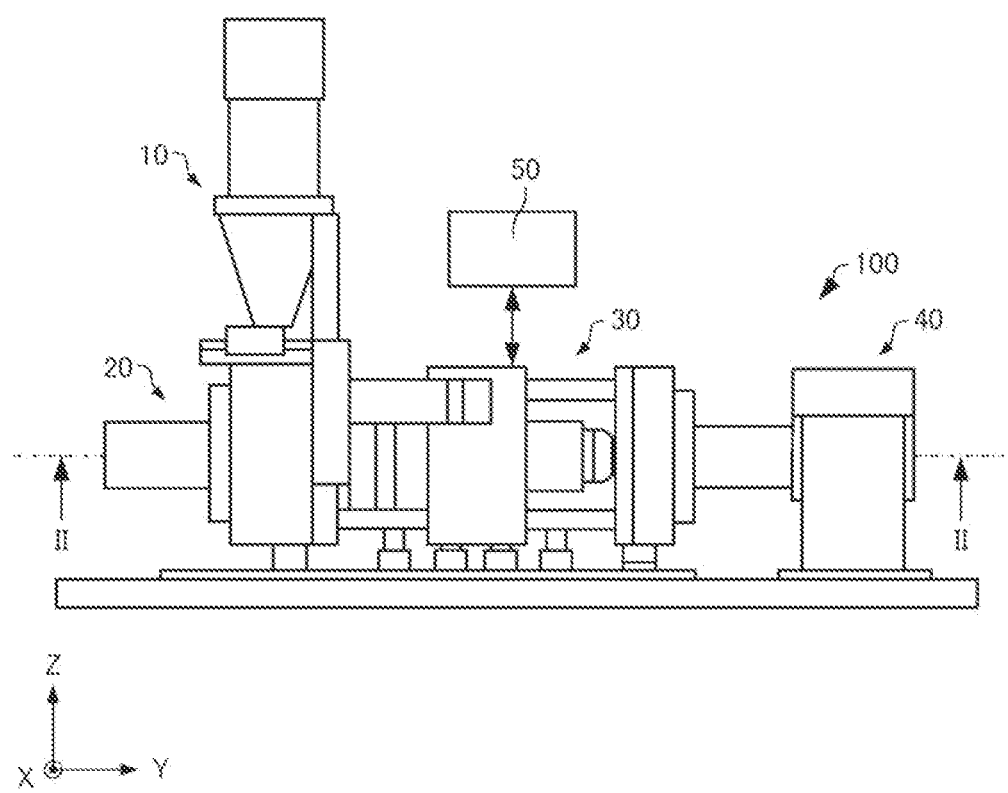
FIG. 1 is a side view schematically showing an injection molding apparatus according to the present embodiment.

First, an injection molding apparatus according to the present embodiment will be described with reference to the drawings. FIG. 1 is a side view schematically showing an injection molding apparatus 100 according to the present embodiment. FIG. 1 shows an X axis, a Y axis, and a Z axis as three axes orthogonal to one another. An X-axis direction and a Y-axis direction are, for example, horizontal directions. A Z-axis direction is, for example, a vertical direction.

As shown in FIG. 1, the injection molding apparatus 100 includes, for example, a material supply unit 10, an injection unit 20, a mold unit 30, a mold clamping unit 40, and a control unit 50.

The material supply unit 10 supplies a material to the injection unit 20. The material supply unit 10 is configured by, for example, a hopper. A material in a form of pellets or powder is supplied to the material supply unit 10. Examples of the material supplied to the material supply unit 10 include an acrylonitrile butadiene styrene (ABS) resin in a form of pellets.

The injection unit 20 plasticizes the material supplied from the material supply unit 10 into a molten material. Then, the injection unit 20 injects the molten material toward the mold unit 30.

Plasticization is a concept that includes melting, and is a change from a solid to a fluid state. Specifically, in a case of a material in which a glass transition occurs, the plasticization means raising a temperature of the material to be equal to or higher than a glass transition point. In a case of a material in which a glass transition does not occur, the plasticization means raising the temperature of the material to be equal to or higher than a melting point.

A cavity corresponding to a shape of the molded product is formed in the mold unit 30. The molten material injected from the injection unit 20 flows into the cavity. Then, the molten material is cooled and solidified to produce the molded product.

The mold clamping unit 40 opens and closes the mold unit 30. The mold clamping unit 40 opens the mold unit 30 after the molten material is cooled and solidified. As a result, the molded product is discharged to the outside.

The control unit 50 is configured by, for example, a computer including a processor, a main storage device, and an input and output interface that inputs and outputs a signal to and from the outside. The control unit 50 exerts various functions by, for example, the processor executing a program read into the main storage device. Specifically, the control unit 50 controls the injection unit 20 and the mold clamping unit 40. The control unit 50 may be configured by a combination of a plurality of circuits instead of the computer.

1.2. Specific Configuration

Figure 2:
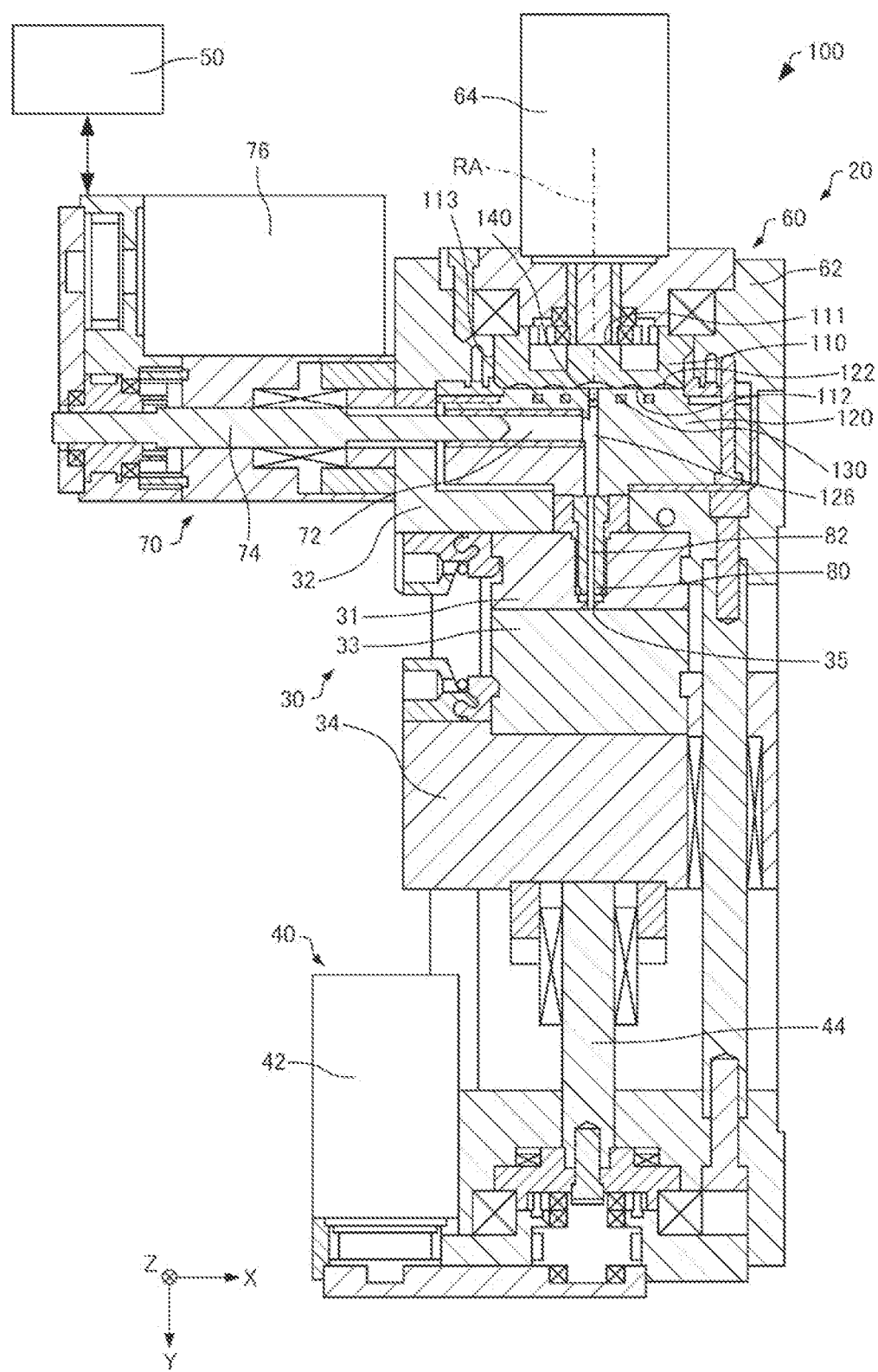
FIG. 2 is a cross-sectional view schematically showing the injection molding apparatus according to the present embodiment.

FIG. 2 is a cross-sectional view taken along a line II-II of FIG. 1 and schematically shows the injection molding apparatus 100. FIG. 2 illustrates the injection unit 20, the mold unit 30, the mold clamping unit 40, and the control unit 50. As shown in FIG. 2, the injection unit 20 includes, for example, a plasticizing unit 60, an injection control unit 70, and a nozzle 80.

The plasticizing unit 60 plasticizes the material supplied from the material supply unit 10, generates a fluid molten material in a form of paste, and guides the material to the injection control unit 70. The plasticizing unit 60 includes, for example, a screw case 62, a drive motor 64, a flat screw 110, and a barrel 120, a heating unit 130, and a check valve 140.

The screw case 62 is a housing that accommodates the flat screw 110. The flat screw 110 is accommodated in a space surrounded by the screw case 62 and the barrel 120.

The drive motor 64 is provided on an upper surface of the screw case 62. The drive motor 64 rotates the flat screw 110. The drive motor 64 is controlled by the control unit 50.

Figure 3:
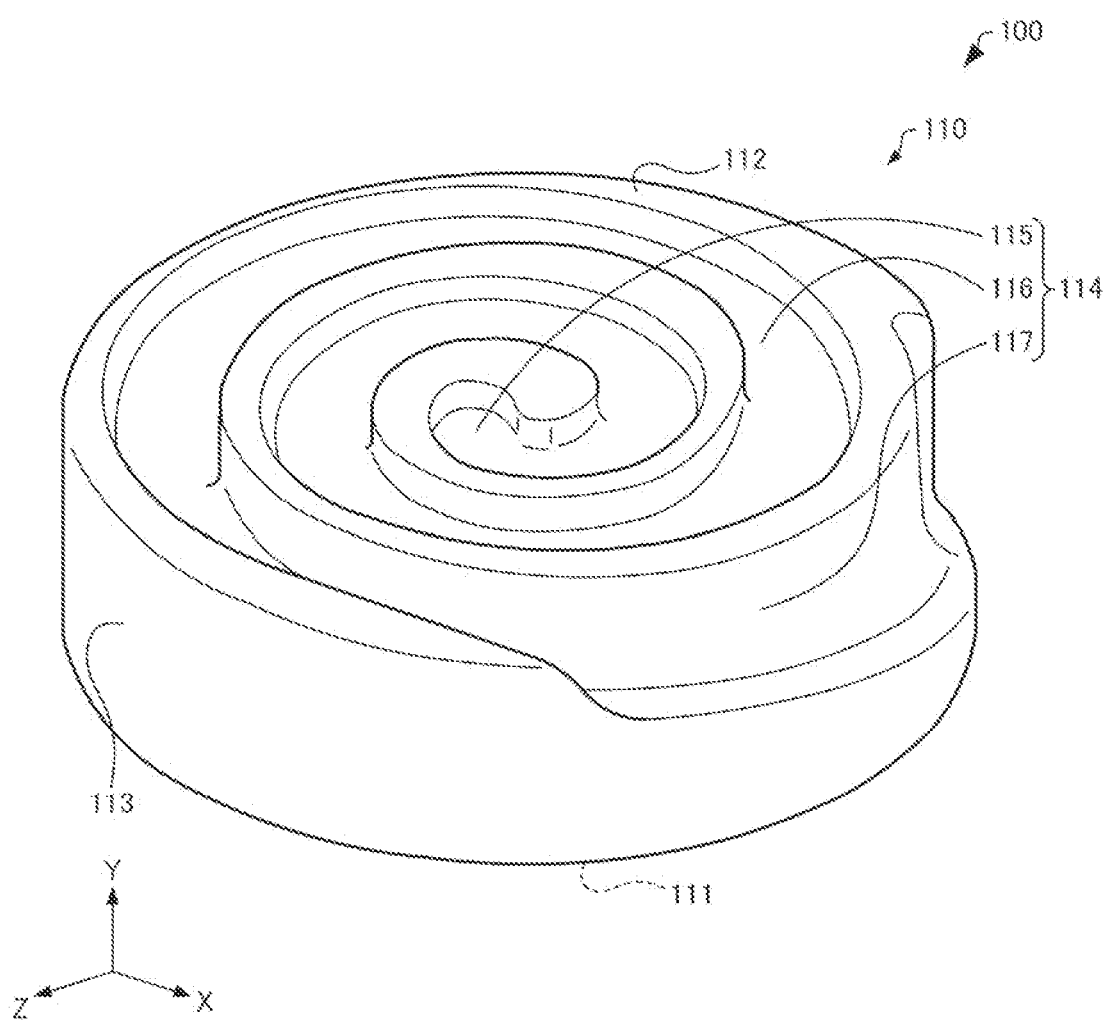
FIG. 3 is a perspective view schematically showing a flat screw of the injection molding apparatus according to the present embodiment.

The flat screw 110 has a substantially cylindrical shape in which a size in a rotation axis RA direction is smaller than a size in a direction orthogonal to the rotation axis RA direction. In an illustrated example, a rotation axis RA is parallel to the Y axis. The flat screw 110 rotates around the rotation axis RA due to a torque generated by the drive motor 64. The flat screw 110 has an upper surface 111, a groove forming surface 112 on an opposite side of the upper surface 111, and a side surface 113 coupling the upper surface 111 and the groove forming surface 112. Here, FIG. 3 is a perspective view schematically showing the flat screw 110. For convenience, FIG. 3 shows a state in which a vertical positional relationship of the flat screw 110 is reversed from a state shown in FIG. 2. In FIG. 2, the flat screw 110 is shown in a simplified manner.

As shown in FIG. 3, a first groove 114 is provided on the groove forming surface 112 of the flat screw 110. The first groove 114 includes, for example, a central portion 115, a groove coupling portion 116, and a material introduction portion 117. The central portion 115 faces a communication hole 126 provided in the barrel 120. The central portion 115 communicates with the communication hole 126. The groove coupling portion 116 couples the central portion 115 and the material introducing portion 117. In the illustrated example, the groove coupling portion 116 is provided in a spiral shape from the central portion 115 toward an outer periphery of the groove forming surface 112. The material introduction portion 117 is provided on the outer periphery of the groove forming surface 112. That is, the material introduction portion 117 is provided on the side surface 113 of the flat screw 110. The material supplied from the material supply unit 10 is introduced from the material introduction portion 117 into the first groove 114, passes through the groove coupling portion 116 and the central portion 115, and is transported to the communication hole 126 provided in the barrel 120. The number of the first grooves 114 is not particularly limited, and two or more first grooves 114 may be provided.

Figure 4:
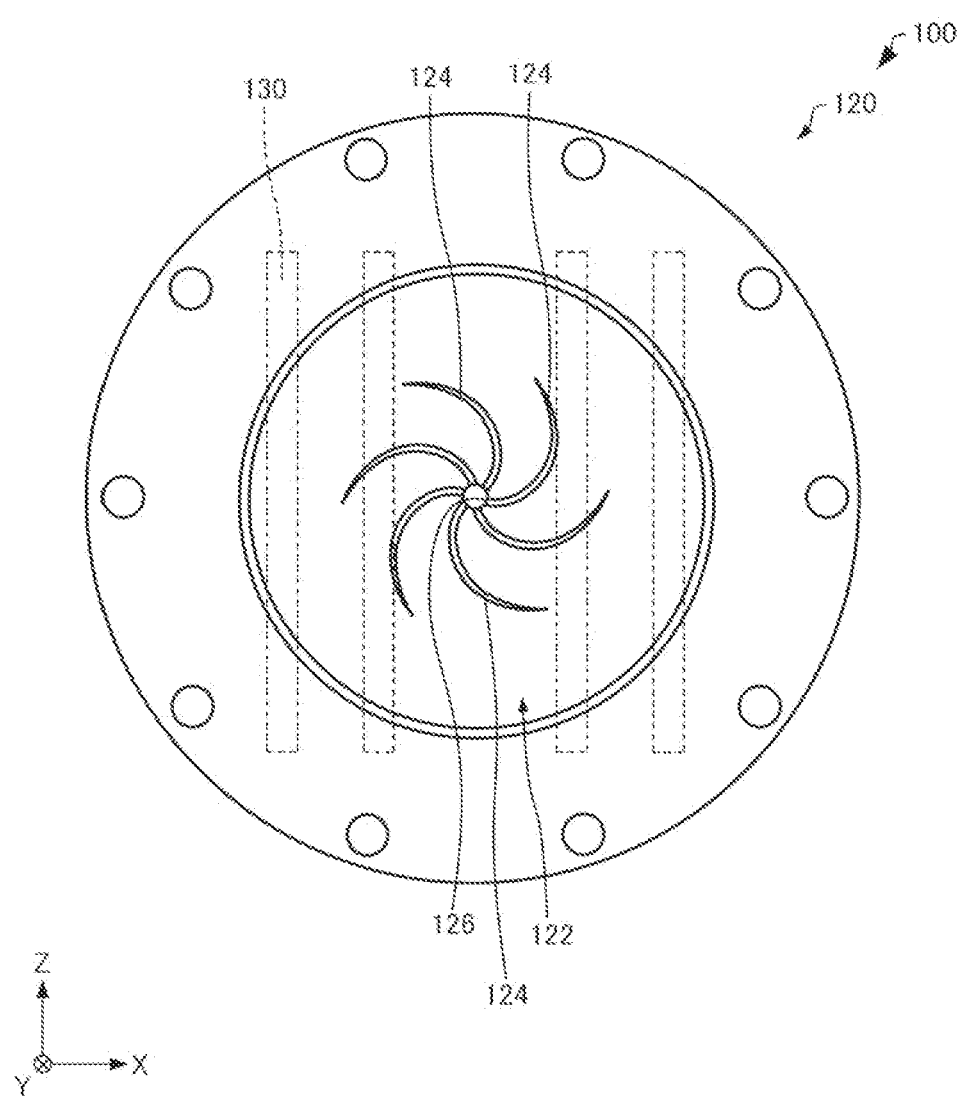
FIG. 4 is a plan view schematically showing a barrel of the injection molding apparatus according to the present embodiment.

The barrel 120 is provided below the flat screw 110, as shown in FIG. 2. The barrel 120 has a facing surface 122 facing the groove forming surface 112 of the flat screw 110. The communication hole 126 is provided at a center of the facing surface 122. FIG. 4 is a plan view schematically showing the barrel 120. For convenience, in FIG. 2, the barrel 120 is shown in a simplified manner.

As shown in FIG. 4, the facing surface 122 of the barrel 120 is provided with second grooves 124 and the communication hole 126. A plurality of second grooves 124 are provided. In the illustrated example, six second grooves 124 are provided, but the number thereof is not particularly limited. The plurality of second grooves 124 are provided around the communication hole 126 when viewed from the Y-axis direction. One end of the second groove 124 is coupled to the communication hole 126 and the second groove 124 extends from the communication hole 126 toward the outer periphery of the facing surface 122 in a spiral shape. The second groove 124 has a function of guiding the molten material to the communication hole 126.

A shape of the second groove 124 is not particularly limited, and may be, for example, a straight line shape. The second grooves 124 may be not provided on the facing surface 122. However, in consideration of efficient guide of the molten material to the communication hole 126, the second grooves 124 are preferably provided on the facing surface 122.

The heating unit 130 heats the material supplied to between the flat screw 110 and the barrel 120. In the illustrated example, the heating unit 130 is configured by four heaters provided in the barrel 120. Output of the heating unit 130 is controlled by the control unit 50. The plasticizing unit 60 generates the molten material by heating the material by the heating unit 130 while transporting the material toward the communication hole 126 by the flat screw 110 and the barrel 120, and causes the generated molten material to flow out from the communication hole 126 to the injection control unit 70.

As shown in FIG. 2, the check valve 140 is provided in the communication hole 126. The check valve 140 prevents the molten material from the communication hole 126 from flowing back to the first groove 114 provided in the flat screw 110.

The injection control unit 70 includes, for example, a cylinder 72, a plunger 74, and a plunger drive unit 76. The cylinder 72 is a substantially cylindrical member coupled to the communication hole 126. The plunger 74 moves inside the cylinder 72. The plunger 74 is driven by the plunger drive unit 76 configured by a motor, a gear, or the like. The plunger drive unit 76 is controlled by the control unit 50.

The injection control unit 70 performs a metering operation and an injecting operation by sliding the plunger 74 in the cylinder 72. The metering operation refers to an operation of guiding the molten material located in the communication hole 126 into the cylinder 72 by moving the plunger 74 in an −X-axis direction away from the communication hole 126 and performing metering in the cylinder 72. The injecting operation refers to an operation of injecting the molten material in the cylinder 72 into the mold unit 30 via the nozzle 80 by moving the plunger 74 in a +X-axis direction approaching the communication hole 126.

The nozzle 80 is provided with a nozzle hole 82 that communicates with the communication hole 126. By performing the above metering operation and injecting operation, the molten material metered in the cylinder 72 is sent from the injection control unit 70 to the nozzle hole 82 via the communication hole 126. Then, the molten material is injected from the nozzle hole 82 into the mold unit 30.

The mold unit 30 includes a first mounting block 32 configured such that a fixed mold 31 can be mounted thereon, and a second mounting block 34 configured such that a movable mold 33 can be mounted thereon. The fixed mold 31 is detachable relative to the first mounting block 32. The movable mold 33 is detachable relative to the second mounting block 34. The movable mold 33 faces the fixed mold 31. The fixed mold 31 and the movable mold 33 are metal molds. The mold unit 30 includes a cavity 35 between the fixed mold 31 and the movable mold 33. The injection unit 20 injects the molten material into the cavity 35 defined by the fixed mold and the movable mold 33. The cavity 35 is a space corresponding to the shape of the molded product. A detailed configuration of the second mounting block 34 of the mold unit 30 will be described later. For convenience, in FIG. 2, the second mounting block 34 is shown in a simplified manner.

The mold clamping unit 40 includes, for example, a mold drive unit 42 and a ball screw 44. The mold drive unit 42 is configured by, for example, a motor, a gear, or the like. The mold drive unit 42 is coupled to the second mounting block 34 via the ball screw 44. Driving of the mold drive unit 42 is controlled by the control unit 50. The ball screw 44 transmits power generated by the drive of the mold drive unit 42 to the second mounting block 34. The mold clamping unit 40 moves the second mounting block 34 using the mold drive unit 42 and the ball screw 44 so as to open and close the mold unit 30.

1.3. Configuration of Mold Unit

Figure 5:
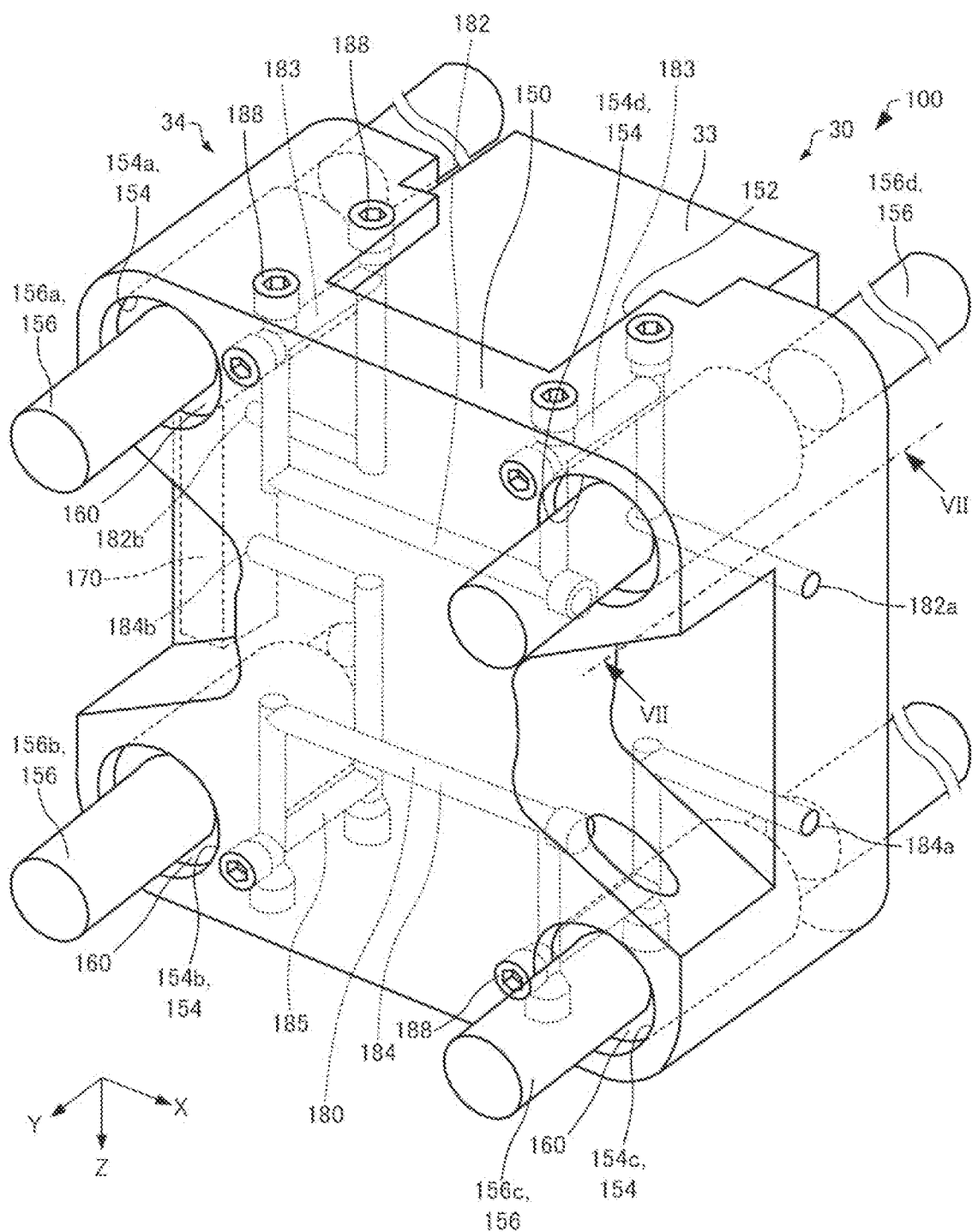
FIG. 5 is a perspective view schematically showing a mold unit of the injection molding apparatus according to the present embodiment.
Figure 6:
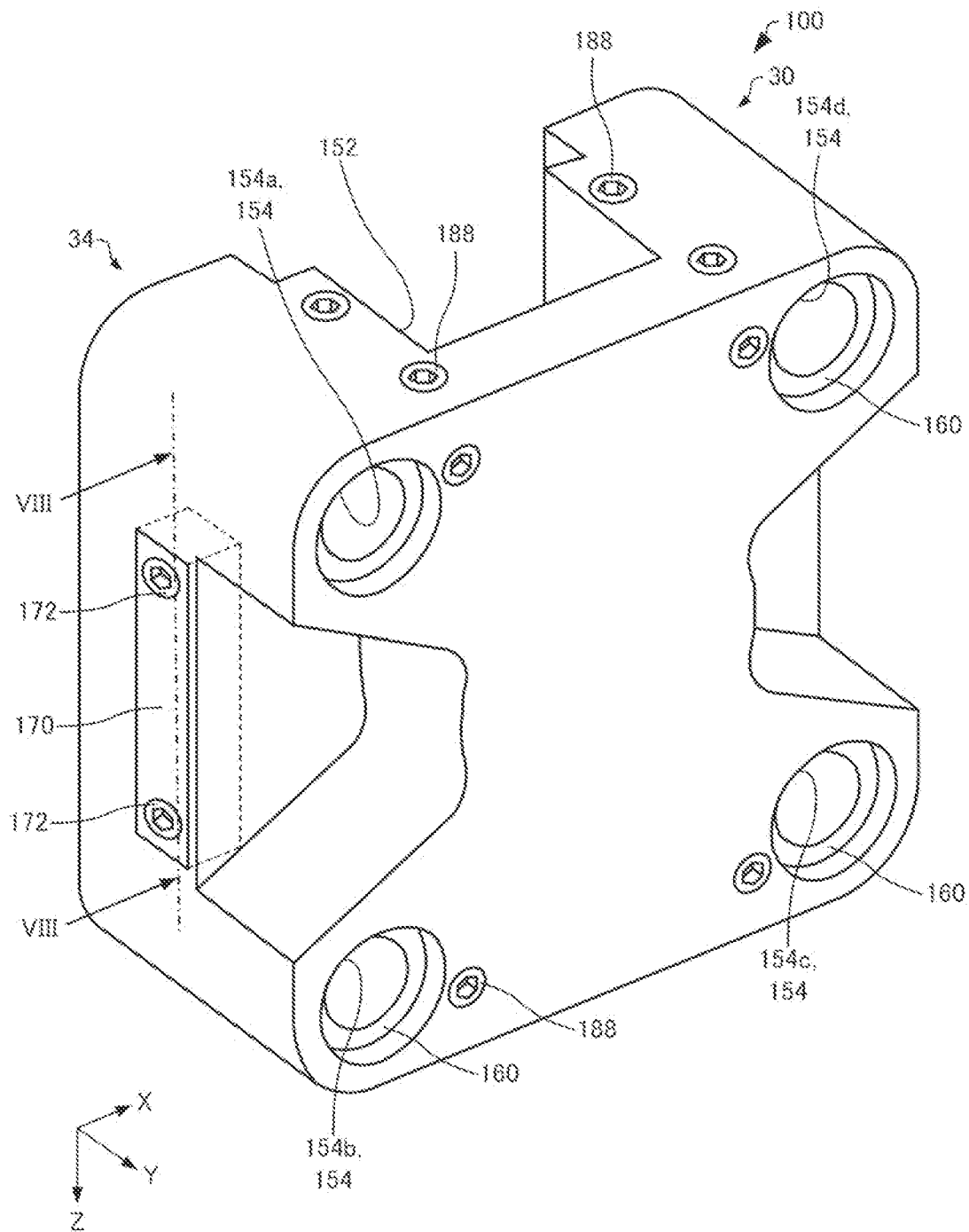
FIG. 6 is a perspective view schematically showing the mold unit of the injection molding apparatus according to the present embodiment.
Figure 7:
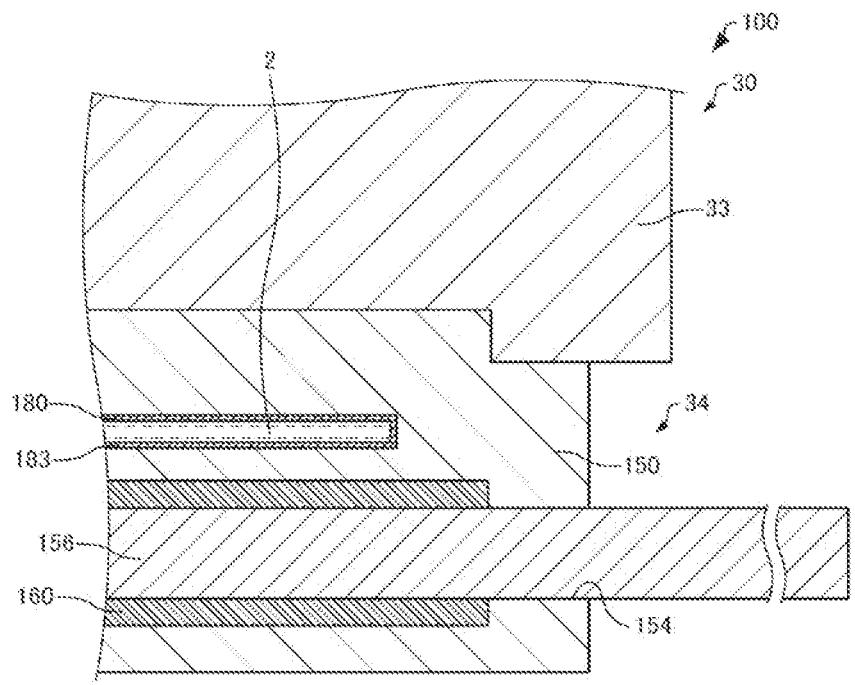
FIG. 7 is a cross-sectional view schematically showing the mold unit of the injection molding apparatus according to the present embodiment.
Figure 8:
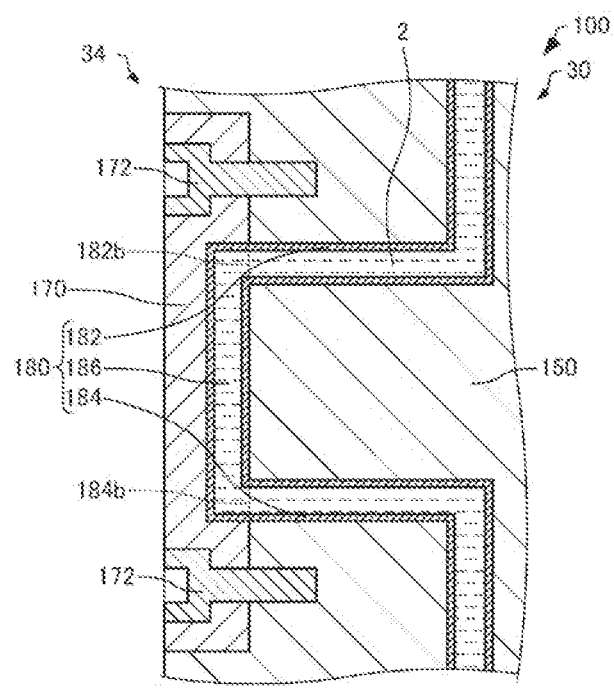
FIG. 8 is a cross-sectional view schematically showing the mold unit of the injection molding apparatus according to the present embodiment.

FIGS. 5 and 6 are perspective views schematically showing the mold unit 30. FIG. 7 is a cross-sectional view taken along a line VII-VII in FIG. 5 and schematically shows the mold unit 30. FIG. 8 is a cross-sectional view taken along a line VIII-VIII in FIG. 5 and schematically shows the mold unit 30. For convenience, FIG. 5 omits an illustration of the fixed mold 31 and the first mounting block 32. FIG. 6 omits an illustration of the fixed mold 31, the first mounting block 32 and the movable mold 33.

As shown in FIGS. 5 to 8, the second mounting block 34 of the mold unit 30 includes, for example, a base portion 150, slide mechanisms 160, a relay portion 170, and a heat conduction prevention portion 180.

The base portion 150 has a shape to which the movable mold 33 can be mounted. In an example shown in FIG. 5, a recess 152 is provided in the base portion 150, and the movable mold 33 is accommodated in the recess 152. The base portion 150 has, for example, a substantially quadrangular shape when viewed from the Y-axis direction. A material of the base portion 150 is not particularly limited, and is, for example, a metal.

The base portion 150 is provided with through holes 154. In the illustrated example, the through hole 154 penetrates the second mounting block 34 in the Y-axis direction. A longitudinal direction of the through hole 154 is the Y-axis direction. In the illustrated example, four through holes 154 are provided, and are provided respectively at substantially four corners of the second mounting block 34. A shape of the through hole 154 is, for example, a circle when viewed from the Y-axis direction. The number and shape of the through hole 154 are not particularly limited.

A diver 156 is inserted through the through hole 154. The diver 156 is, for example, a rod-shaped member extending in the Y-axis direction. The second mounting block 34 moves back and forth with respect to the first mounting block 32 along the diver 156. In the illustrated example, the second mounting block 34 is movable in the Y-axis direction along the diver 156. A material of the diver 156 is not particularly limited, and is, for example, a metal. For convenience, FIG. 6 omits an illustration of the diver 156.

A plurality of divers 156 are provided corresponding to the number of the plurality of through holes 154. In the illustrated example, four divers 156 are provided. A first diver 156*a* among the four divers 156 is inserted into a first through hole 154*a* among the four through holes 154. A second diver 156*b* is inserted through a second through hole 154*b*. A third diver 156*c* is inserted through a third through hole 154*c*. A fourth diver 156*d* is inserted through a fourth through hole 154*d*.

The slide mechanism 160 is provided in the through hole 154. Specifically, the slide mechanism 160 is provided on an inner surface of the through hole 154. The inner surface of the through hole 154 is a surface of the base portion 150 that defines the through hole 154. A plurality of slide mechanisms 160 are provided corresponding to the plurality of through holes 154. The slide mechanisms 160 slide the second mounting block 34 along the diver 156. Examples of the slide mechanism 160 include a linear bush. A material of the slide mechanism 160 is not particularly limited, and is, for example, a metal, a ceramic and the like.

As shown in FIG. 6, the relay portion 170 is provided on the base portion 150. In the illustrated example, the relay portion 170 is mounted on the base portion 150 in the −X-axis direction. The relay portion 170 can be mounted on the base portion 150. The relay portion 170 is detachably provided on the base portion 150 by, for example, a screw 172. A material of the relay portion 170 is, for example, the same as that of the base portion 150.

The heat conduction prevention portion 180 is provided in, for example, the base portion 150 and the relay portion 170. The heat conduction prevention portion 180 prevents conduction of heat from the movable mold 33. Specifically, the heat conduction prevention portion 180 prevents conduction of heat from the movable mold 33 to the through holes 154 in a state where the movable mold 33 is mounted on the second mounting block 34.

The heat conduction prevention portion 180 is a cooling pipe through which a refrigerant 2 flows. The refrigerant 2 is not particularly limited, and examples thereof include water. Although not shown, the heat conduction prevention portion 180 is coupled to, for example, a circulation device for sending the refrigerant 2 and a cooling device for cooling the refrigerant 2.

The heat conduction prevention portion 180 includes, for example, a first portion 182, a second portion 184, and a coupling portion 186. The first portion 182, the second portion 184, and the coupling portion 186 are, for example, one common cooling pipe through which the refrigerant 2 flows.

The first portion 182 of the heat conduction prevention portion 180 is provided in the base portion 150. The first portion 182 includes an end portion 182*a* located in the +X-axis direction of the base portion 150 and an end portion 182*b* coupled to the coupling portion 186. The first portion 182 is provided between the movable mold 33 and the through holes 154 in a state where the movable mold 33 is mounted thereon. The first portion 182 is provided along the longitudinal direction of the through hole 154. In the illustrated example, the first portion 182 includes a portion 183 along the longitudinal direction of the through hole 154. In the illustrated example, the first portion 182 passes linearly between the movable mold 33 and the first through hole 154a along the Y-axis direction, and further passes linearly between the movable mold 33 and the fourth through hole 154d along the Y-axial direction.

In the example shown in FIG. 5, the first portion 182 of the heat conduction prevention portion 180 extends from the end portion 182a in the −X-axis direction, extends in a −Z-axis direction, extends in a +Y-axis direction, extends in a +Z-axis direction, extends in the −X-axial direction, extends in the −Z-axis direction, extends in a −Y-axis direction, extends in the +Z-axis direction, extends in the −X-axis direction, and reaches the end portion 182b.

The second portion 184 of the heat conduction prevention portion 180 is provided in the base portion 150. The second portion 184 is separated from the first portion 182. In the illustrated example, the second portion 184 is provided in the +Z-axis direction with respect to the first portion 182. The second portion 184 includes an end portion 184a located in the +X-axis direction of the base portion 150 and an end portion 184b coupled to the coupling portion 186. The second portion 184 is provided between the movable mold 33 and the through holes 154 in the state where the movable mold 33 is mounted thereon. The second portion 184 is provided along the longitudinal direction of the through hole 154. In the illustrated example, the second portion 184 includes a portion 185 along the longitudinal direction of the through hole 154. In the illustrated example, the second portion 184 passes linearly between the movable mold 33 and the second through hole 154b along the Y-axis direction, and further passes linearly between the movable mold 33 and the fourth through hole 154d along the Y-axial direction.

In the example shown in FIG. 5, the second portion 184 of the heat conduction prevention portion 180 extends from the end portion 184b in the +X-axis direction, extends in the +Z-axis direction, extends in the +Y-axis direction, extends in a −Z-axis direction, extends in the +X-axial direction, extends in the +Z-axis direction, extends in the −Y-axis direction, extends in the −Z-axis direction, extends in the +X-axis direction, and reaches the end portion 184a.

As shown in FIG. 8, the coupling portion 186 of the heat conduction prevention portion 180 is provided in the relay portion 170. The coupling portion 186 couples the first portion 182 and the second portion 184 in a state where the relay portion 170 is mounted on the base portion 150. The refrigerant 2 flowing through the heat conduction prevention portion 180 is introduced from the end portion 182a of the first portion 182, passes through the first portion 182, the coupling portion 186, and the second portion 184, and is discharged from the end portion 184a of the second portion 184.

Examples of a method for forming the heat conduction prevention portion 180 include a method of repeating a step of opening a hole in the base portion 150 with a drill or the like, inserting a linear tube into the hole, and sealing one opening of the tube with a sealing member 188. A plurality of tubes are joined by a known method.

The method for forming the heat conduction prevention portion 180 is not limited to the above method, and may be, for example, a method using a 3D printer capable of creating a three-dimensional object. If the method using the 3D printer is used, the heat conduction prevention portion 180 having a more complicated shape can be formed.

1.4. Action Effect

In the injection molding apparatus 100, in a state where the movable mold 33 is mounted on the second mounting block 34, the second mounting block 34 includes the heat conduction prevention portion 180, that prevents conduction of heat from the movable mold 33, between the movable mold 33 and the first through hole 154a. Therefore, in the injection molding apparatus 100, the heat of the movable mold 33 is prevented from being conducted to the first through hole 154a as compared with a case where the heat conduction prevention portion is not provided between the movable mold and the first through hole. As a result, the heat of the movable mold 33 can be prevented from being conducted to the slide mechanism 160 provided in the first through hole 154a, and a temperature of the slide mechanism 160 can be prevented from exceeding a heat resistant temperature of the slide mechanism 160. As a result, a decrease in mold clamping accuracy can be prevented. Further, a life of the slide mechanism 160 can be extended and a maintenance replacement time can be extended. The movable mold 33 includes, for example, a heater (not shown), and heat conducted from the heater to the slide mechanism 160 can be reduced in the injection molding apparatus 100.

In the injection molding apparatus 100, the second mounting block 34 includes, in the first through hole 154a, the slide mechanism 160 that slides the second mounting block 34 along the first diver 156a. Therefore, in the injection molding apparatus 100, the second mounting block 34 can be easily moved back and forth with respect to the first mounting block 32.

In the injection molding apparatus 100, the heat conduction prevention portion 180 is provided along the longitudinal direction of the first through hole 154a. Therefore, in the injection molding apparatus 100, the heat can be efficiently prevented from being conducted to the first through hole 154a as compared with a case where the heat conduction prevention portion is not provided along the longitudinal direction of the first through hole.

In the injection molding apparatus 100, the heat conduction prevention portion 180 is a cooling pipe through which the refrigerant 2 flows. Therefore, in the injection molding apparatus 100, the first through hole 154a can be cooled by the refrigerant 2 flowing through the cooling pipe.

In the injection molding apparatus 100, the second mounting block 34 is provided with the second through hole 154b through which the second diver 156b can be inserted, in a state where the movable mold 33 is mounted on the second mounting block 34, the heat conduction prevention portion 180 is provided between the movable mold 33 and the second through hole 154b, and the first portion 182 of the heat conduction prevention portion 180 provided between the movable mold 33 and the first through hole 154a and the second portion 184 of the heat conduction prevention portion 180 provided between the movable mold 33 and the second through hole 154b are one common cooling pipe through which the refrigerant 2 flows. In this way, in the injection molding apparatus 100, the heat can be prevented from being conducted to the plurality of through holes 154 by one heat conduction prevention portion 180. Therefore, for example, the number of the circulation device for sending the refrigerant 2 and the cooling device for cooling the refrigerant 2 can be reduced as compared with a case where a plurality of heat conduction prevention portions are provided. As a result, reduction in size can be achieved.

In the injection molding apparatus 100, the second mounting block 34 includes the relay portion 170 that is detachable relative to the base portion 150. Further, the heat conduction prevention portion 180 includes the first portion 182 disposed between the movable mold 33 and the first through hole 154a and the second portion 184 disposed between the movable mold 33 and the second through hole 154b in a state where the movable mold 33 is mounted thereon, which are provided in the base portion 150. Further, the heat conduction prevention portion 180 includes the coupling portion 186 that is provided in the relay portion 170, and that couples the first portion 182 and the second portion 184 in a state where the relay portion 170 is mounted on the base portion 150. Therefore, in the injection molding apparatus 100, by attaching or detaching the relay portion 170 to or from the base portion 150, a pattern in which the heat is prevented from being conducted to the through holes 154a and 154b by one continuous heat conduction prevention portion 180, and a pattern in which the heat is prevented from being conducted to the through holes 154a and 154b by the heat conduction prevention portion 180 branched into two can be selected.

In the above example, the heat conduction prevention portion 180 is a cooling pipe through which the refrigerant 2 flows, but the heat conduction prevention portion 180 may be a heat insulating material. In such a case, the heat of the movable mold 33 can also be prevented from being conducted to the through hole 154. Examples of the heat insulating material include polystyrene foam, polyurethane foam, methacrylic resin foam, phenol resin foam, polyolefin resin foam, foam rubber, glass wool, rock wool, foamed ceramics, and vacuum blocking members. Further, although not shown, the heat conduction prevention portion 180 may be configured by the cooling pipe through which the refrigerant 2 flows and a heat insulating material covering the cooling pipe.

Further, in the above example, as a screw, the flat screw 110 having the size in the rotation axis RA direction smaller than the size in the direction orthogonal to the rotation axis RA direction is used, but instead of the flat screw 110, a rod-shaped in-line screw having a larger size in the rotation axis RA direction may be used.

2. Modification of Injection Molding Apparatus 2.1. First Modification

Figure 9:
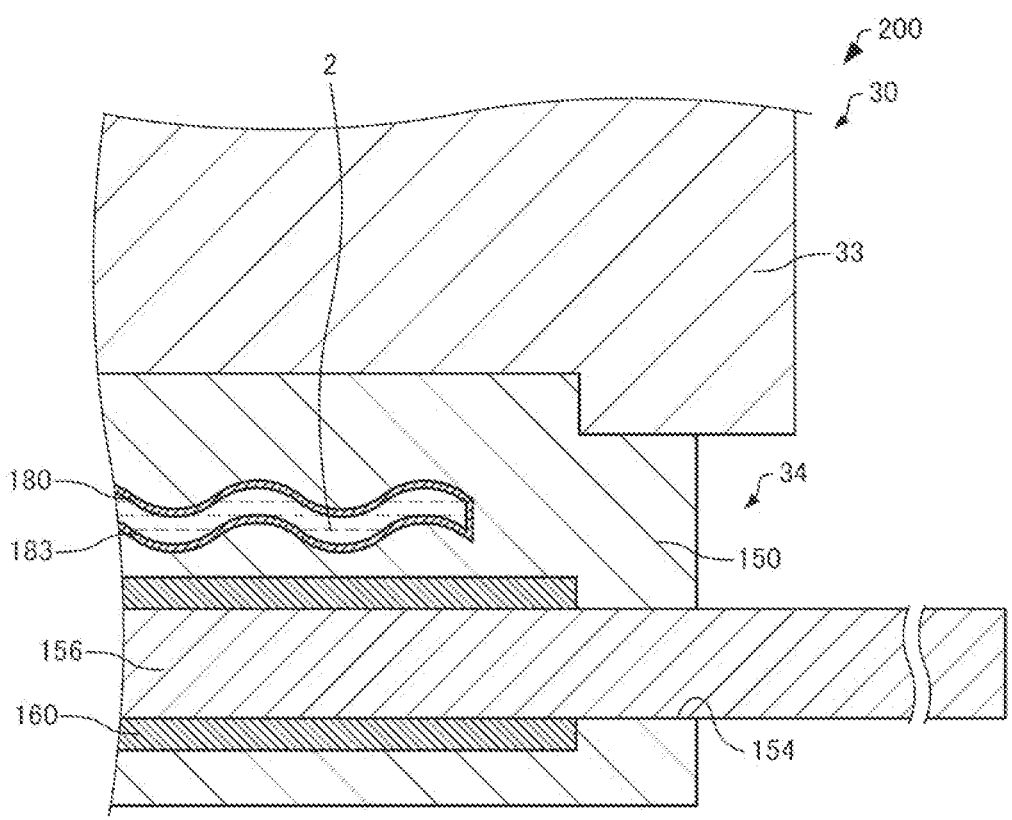
FIG. 9 is a cross-sectional view schematically showing a mold unit of an injection molding apparatus according to a modification of the present embodiment.

Next, an injection molding apparatus according to a first modification of the present embodiment will be described with reference to the drawings. FIG. 9 is a cross-sectional view schematically showing an injection molding apparatus 200 according to the first modification of the present embodiment.

Hereinafter, in the injection molding apparatus 200 according to the first modification of the present embodiment, members having the same functions as constituent members of the injection molding apparatus 100 according to the embodiment described above are denoted by the same reference numerals, and detailed description thereof will be omitted.

In the injection molding apparatus 100 described above, as shown in FIG. 7, the heat conduction prevention portion 180 is provided linearly along the longitudinal direction of the through hole 154.

In contrast, in the injection molding apparatus 200, as shown in FIG. 9, the heat conduction prevention portion 180 is provided so as to be bent along the longitudinal direction of the through hole 154. Therefore, in the injection molding apparatus 200, a volume of the heat conduction prevention portion 180 can be increased as compared with the case where the heat conduction prevention portion 180 is provided linearly along the longitudinal direction of the through hole 154. As a result, the heat conduction to the through hole 154 can be further prevented.

2.2. Second Modification

Next, an injection molding apparatus according to a second modification of the present embodiment will be described. In the injection molding apparatus 100 described above, ABS in a form of pellets is used as a material for forming the molded product.

In contrast, in the injection molding apparatus according to the second modification of the present embodiment, examples of the material used in the plasticizing unit 60 include materials having various materials such as a material having thermoplasticity other than the ABS, a metal material, and a ceramic material as main materials. Here, the "main materials" mean central materials forming a shape of the molded product, and mean materials having a content of 50 wt % or more in the molded product. The above material includes a material obtained by melting the main materials thereof alone or a material obtained by melting the main materials and a part of components contained in the main materials into a paste shape.

For example, the thermoplastic resin can be used as the material having thermoplasticity. Examples of the thermoplastic resin include general-purpose engineering plastics such as polypropylene (PP), polyethylene (PE), polyacetal (POM), polyvinyl chloride (PVC), polyamide (PA), acrylonitrile butadiene styrene (ABS), polylactic acid (PLA), polyphenylene sulfide (PPS), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyetheretherketone (PEEK).

An additive such as a wax, a flame retardant, an antioxidant, and a heat stabilizer may be mixed into the material having thermoplasticity, in addition to a pigment, a metal, and a ceramic. In the plasticizing unit 60, the material having thermoplasticity is plasticized by the rotation of the flat screw 110 and the heating of the heating unit 130, and is converted into a melted state. After the molten material generated in such a manner is discharged from the nozzle 80, the molten material is cured due to a decrease in temperature.

It is desirable that the material having thermoplasticity is discharged from the nozzle 80 in a state where the material is heated to a temperature equal to or higher than the glass transition point thereof and is melted completely. For example, the ABS has a glass transition point of about 120° C. and it is desirable that the material is about 200° C. at a time of being discharged from the nozzle 80.

In the plasticizing unit 60, for example, the metal material may be used as the main material instead of the material having thermoplasticity described above. In this case, it is desirable that a component to be melted at the time of generating the molten material is mixed with a powder material obtained by converting the metal material into powder, and then the mixture is charged into the plasticizing unit 60.

Examples of the metal material include a single metal of magnesium (Mg), iron (Fe), cobalt (Co) or chromium (Cr), aluminum (Al), titanium (Ti), copper (Cu), nickel (Ni), an alloy containing one or more these metals, or a maraging steel, a stainless steel, cobalt chrome molybdenum, a titanium alloy, a nickel alloy, an aluminum alloy, a cobalt alloy, and a cobalt chromium alloy.

In the plasticizing unit 60, the ceramic material may be used as the main material instead of the above metal material. Examples of the ceramic material include oxide ceramics such as silicon dioxide, titanium dioxide, aluminum oxide, and zirconium oxide, and non-oxide ceramics such as aluminum nitride.

The powder material of the metal material or the ceramic material charged into the material supply unit 10 may be a mixed material obtained by mixing a plurality of types of powder of single metal powder, alloy powder, and ceramic material powder. The powder material of the metal material or the ceramic material may be coated with, for example, the above thermoplastic resin or a thermoplastic resin other than the above thermoplastic resin. In this case, the thermoplastic resin may be melted to exhibit fluidity in the plasticizing unit 60.

For example, a solvent can be added to the powder material of the metal material or the ceramic material charged into the material supply unit 10. Examples of the solvent include water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and isobutyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (for example, tetrabutylammonium acetate); and ionic liquids such as butyl carbitol acetate.

In addition, for example, a binder may be added to the powder material of the metal material or the ceramic material charged into the material supply unit 10. Examples of the binder include acrylic resin, epoxy resin, silicone resin, cellulose-based resin or other synthetic resins or polylactic acid (PLA), polyamide (PA), polyphenylene sulfide (PPS), polyetheretherketone (PEEK) or other thermoplastic resins.

The embodiment and the modifications described above are merely examples, and the present disclosure is not limited thereto. For example, each embodiment and each modification can be combined as appropriate.

The present disclosure includes a configuration substantially the same as the configuration described in the embodiments, for example, a configuration having the same function, method, and result, or a configuration having the same object and effect. The present disclosure includes a configuration in which a non-essential portion of the configuration described in the embodiment is replaced. The present disclosure includes a configuration having the same operation effect as the configuration described in the embodiment, or a configuration capable of achieving the same object. The present disclosure includes a configuration in which a known technique is added to the configuration described in the embodiment.

The following contents are derived from the above embodiment.

An injection molding apparatus according to an aspect, includes: a first mounting block configured such that a fixed mold is able to be mounted thereon; a second mounting block configured such that a movable mold facing the fixed mold is able to be mounted thereon, provided with a first through hole through which a first diver is inserted, and configured to move back and forth with respect to the first mounting block along the first diver; and an injection unit configured to inject a molten material into a cavity defined by the fixed mold and the movable mold, and in a state where the movable mold is mounted on the second mounting block, the second mounting block includes, between the movable mold and the first through hole, a heat conduction prevention portion configured to prevent conduction of heat from the movable mold.

According to the above injection molding apparatus, heat of the movable mold can be prevented from being conducted to the first through hole. As a result, the heat of the movable mold is prevented from being conducted to the slide mechanism provided in the first through hole, and a temperature of the slide mechanism can be prevented from exceeding a heat resistant temperature of the slide mechanism.

In the injection molding apparatus according to the above aspect, the second mounting block may include, in the first through hole, a slide mechanism configured to slide the second mounting block along the first diver.

According to the above injection molding apparatus, the second mounting block can be easily moved back and forth with respect to the first mounting block.

In the injection molding apparatus according to the above aspect, the heat conduction prevention portion may be provided along a longitudinal direction of the first through hole.

According to the above injection molding apparatus, the heat can be efficiently prevented from being conducted to the first through hole.

In the injection molding apparatus according to the above aspect, the heat conduction prevention portion may be a cooling pipe through which a refrigerant flows or a heat insulating material.

According to the above injection molding apparatus, the first through hole can be cooled by the refrigerant flowing through the cooling pipe. Further, the heat of the movable mold can be prevented from being conducted to the first through hole by the heat insulating material.

In the injection molding apparatus according to the above aspect, the heat conduction prevention portion may be provided so as to be bent along a longitudinal direction of the first through hole.

According to the above injection molding apparatus, a volume of the heat conduction prevention portion can be increased. As a result, the heat can be further prevented from being conducted to the first through hole.

In the injection molding apparatus according to the above aspect, the second mounting block may be provided with a second through hole through which a second diver is able to be inserted, in a state where the movable mold is mounted on the second mounting block, the heat conduction prevention portion may be provided between the movable mold and the second through hole, and the heat conduction prevention portion provided between the movable mold and the first through hole and the heat conduction prevention portion provided between the movable mold and the second through hole may be one common cooling pipe through which the refrigerant flows.

According to the above injection molding apparatus, the heat can be prevented from being conducted to the plurality of through holes by one heat conduction prevention portion.

In the injection molding apparatus according to the above aspect, the second mounting block may include: a base portion provided with the first through hole and the second through hole; and a relay portion detachable relative to the base portion, and the heat conduction prevention portion may include: a first portion provided in the base portion, and disposed between the movable mold and the first through hole in a state where the movable mold is mounted on the second mounting block; a second portion provided in the base portion, and disposed between the movable mold and the second through hole in a state where the movable mold is mounted on the second mounting block; and a coupling portion provided in the relay portion, and coupling the first portion and the second portion in a state where the relay portion is mounted on the base portion.

According to the above injection molding apparatus, a pattern in which the heat is prevented from being conducted to the first through hole and the second through hole by the one continuous heat conduction prevention portion, and a pattern in which the heat is prevented from being conducted to the first through hole and the second through hole by the heat conduction prevention portion branched into two can be selected.

What is claimed is:

1. An injection molding apparatus, comprising:
   a first mounting block on which a fixed mold is mounted;
   a second mounting block on which a movable mold facing the fixed mold is mounted the second mounting block having a first through hole through which a first diver is inserted,
   a linear bush provided at an inner surface of the first through hole of the second mounting block, the linear bush being configured to move the second mounting block back and forth with respect to the first mounting block along the first diver;
   a heat conduction prevention portion disposed in the second mounting block between the movable mold and the linear bush in a state where the movable mold is mounted on the second mounting block, the heat conduction prevention portion extending along a longitudinal direction of the linear bush; and
   an injection unit configured to inject a molten material into a cavity formed by the fixed mold and the movable mold to form a molded product,
   wherein the heat conduction prevention portion is configured to prevent heat conduction from the moveable mold to the linear bush while forming the molded product.

2. The injection molding apparatus according to claim 1, wherein
   the heat conduction prevention portion is provided along a longitudinal direction of the first through hole.

3. The injection molding apparatus according to claim 1, wherein
   the heat conduction prevention portion is a cooling pipe through which a refrigerant flows or a heat insulating material.

4. The injection molding apparatus according to claim 1, wherein
   the heat conduction prevention portion is provided so as to be bent along a longitudinal direction of the first through hole.

5. The injection molding apparatus according to claim 1, wherein
   the second mounting block is provided with a second through hole through which a second diver is inserted, and an inner surface of the second through hole is provided with another linear bush,
   the another linear bush is configured to move the second mounting block back and forth with respect to the first mounting block along the second diver,
   the heat conduction prevention portion is further provided between the movable mold and the another linear bush in a state where the movable mold is mounted on the second mounting block, and the heat conduction prevention portion is configured to prevent heat conduction from the moveable mold to the another linear bush while forming the molded product, and
   in a state where the movable mold is mounted on the second mounting block, the heat conduction prevention portion provided between the movable mold and the linear bush and the heat conduction prevention portion provided between the movable mold and the another linear bush are one common cooling pipe through which the refrigerant flows.

6. The injection molding apparatus according to claim 5, wherein
   the second mounting block includes:
      a base portion provided with the first through hole and the second through hole; and
      a relay portion detachable relative to the base portion, and
   the heat conduction prevention portion includes:
      a first portion provided in the base portion, and disposed between the movable mold and the linear bush in a state where the movable mold is mounted on the second mounting block;
      a second portion provided in the base portion, and disposed between the movable mold and the another liner bush in a state where the movable mold is mounted on the second mounting block; and
      a coupling portion provided in the relay portion, and coupling the first portion and the second portion in a state where the relay portion is mounted on the base portion.

* * * * *